United States Patent
Penninger et al.

(10) Patent No.: US 6,668,552 B1
(45) Date of Patent: Dec. 30, 2003

(54) HYDRAULIC BRAKE BOOSTER

(75) Inventors: William John Penninger, Niles, MI (US); Raymond Kosarski, Jr., Niles, MI (US); John E. Mackiewicz, Niles, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/159,160

(22) Filed: May 30, 2002

(51) Int. Cl.[7] .............................................. B60T 13/20
(52) U.S. Cl. ........................................ 60/555; 60/553
(58) Field of Search ........................... 60/553, 555, 556

(56) References Cited

U.S. PATENT DOCUMENTS 4,123,908 A * 11/1978 Bertone et al. ................ 60/555
4,312,182 A * 1/1982 Filderman ..................... 60/556

* cited by examiner

Primary Examiner—F. Daniel Lopez
(74) Attorney, Agent, or Firm—Leo H McCormick, Jr.; Warren Comstock

(57) ABSTRACT

A hydraulic brake booster has a housing with a stepped bore for retaining a cylindrical piston and a control bore for retaining a control valve. The cylindrical piston defines, with the stepped bore, an output chamber, a relief chamber and a power chamber; and includes a second stepped bore for a reaction piston. The reaction piston includes an axial bore, receiving a plunger defining an actuation chamber and a poppet valve. The input force initially moves the plunger and poppet valve to interrupt communication between the actuation and relief chambers; and thereafter moves the plunger to pressurize fluid in the actuation chamber, creating an input signal. The input signal activates the control valve; generating a regulated pressurized fluid, supplied directly to a second set of wheel brakes and acts on the cylindrical piston, to pressurize operational fluid supplied to a first set of wheel brakes.

10 Claims, 3 Drawing Sheets

HYDRAULIC BRAKE BOOSTER

This invention relates to a hydraulic brake booster wherein a hydraulic input signal derived from a manual input force applied by an operator to a brake pedal is communicated to activate a control valve to supply regulated pressurized fluid to a power piston and develop operational pressurized fluid to effect a brake application as a function of the input force.

BACKGROUND OF THE INVENTION

The present invention is of a type hydraulic brake boosters referred to as a "full-power" brake booster, of which the following U.S. Patents may be are considered to be typical: U.S. Pat. No. 4,441,319; 4,490,977; 4,514,981; 4,665,701; 4,685,297; 4,704,867; 4,724,674; 5,526,731 and 5,927,074. In such brake boosters, an accumulator is charged with fluid pressure and selective activated through movement of a control valve by an input member to present pressurized fluid to an actuation chamber that acts on an actuation piston. The actuation piston in turn provides a force for moving pistons of a master cylinder to pressurize operational fluid that is presented to wheel brakes to effect a brake application. The operational pressure that is developed is proportional to the force applied to the actuation piston and inversely proportional to the cross-sectional area of the piston in the master cylinder for a given force applied to an input member by an operator to move the control valve. The resulting travel of the input member and brake pedal is proportional to the travel of the actuation piston in the master cylinder. This type of hydraulic brake booster functions in a satisfactory manner, however during a manual application, the input force applied to move the pistons in the master cylinder is communicated through control and as a result some lost travel is experienced in the development operational pressure to effect a brake application. A reduction in the loss travel can be achieved by the structure disclosed in co-pending patent U.S. patent application Ser. No. 10/061,648 filed Jan. 31, 2002, however, such structure while functioning in a desired manner is very compact.

SUMMARY OF THE INVENTION

In the present invention a hydraulic brake booster has a housing with a piston arrangement located in a power bore that is connected to a control valve located in a separate control bore such that an input force applied to the piston arrangement is hydraulically communicated to activated the control valve to communicate regulated pressurized supply fluid to the power bore that acts on the piston arrangement to develop pressurized operational fluid in effecting a brake application.

In accordance with this invention, the housing of the hydraulic brake booster has a first stepped bore is connected to a first set of wheel brakes in a vehicle while the control bore is connected to a source of pressurized supply fluid, the first stepped bore and a second set of wheel brakes of a vehicle. An input force applied to the piston arrangement through an input member connected is hydraulically communicated as an input signal to activate the control valve and communicate the regulated pressurized supply fluid from the control bore to the first stepped bore and directly to the second set of wheel brakes during a brake application. The regulated pressurized supply fluid as received by the first stepped bore acts on and moves the piston arrangement in the first stepped bore to pressurize operational fluid therein that is supplied to first set of wheel brakes during a brake application. The hydraulic brake booster is characterized in that the piston arrangement has a cylindrical member with a first peripheral surface concentrically located in the first stepped bore to define an output chamber, a relief chamber and an power chamber within the housing. In turn, the cylindrical member has a second stepped bore therein for receiving a reaction piston that has a second peripheral surface concentrically located in the second stepped bore while the reaction piston has an axial bore therein for receiving a plunger to define an actuation chamber therein. The plunger is directly connected to input member and resiliently linked with a poppet valve located in the axial bore for controlling communication of fluid between the actuation chamber, the relief chamber and the control bore. When an input force is applied by an operator, the input member initially moves the plunger and poppet valve to interrupt hydraulic communication from the actuation chamber to the relief chamber and thereafter moves the plunger to pressurize fluid in the actuation chamber and create a correspondingly hydraulic input signal. This hydraulic input signal activates the control valve in the control bore such that regulated pressurized supply fluid is supplied to the power chamber for moving the first cylindrical body toward the output chamber and pressurize fluid in the output chamber to a predetermined level that the operational fluid is supplied to the first wheel brakes during a brake application that is proportionally to the input force. The control valve is characterized by an actuation piston having a first effective area for receiving the hydraulic input signal during brake application and in a second embodiment by second and third effective areas for receiving second and third hydraulic inputs under the control of an Electronic Control Unit (ECU). The second and third hydraulic inputs are derived by the ECU from sensed conditions relating to the operation of a vehicle and may modify the input signal during a brake application or under certain conditions independently activate the control valve to effect a brake application to eliminate or at least reduce the effect of the sensed conditions.

An advantage of this invention resides in a hydraulic brake booster wherein a first set of wheel brakes is supplied with operational fluid pressure created from regulated pressurized supply fluid and a second set of wheel brakes is directly supplied with regulated pressurized supply fluid to effect a brake application.

An object of this invention is to provide a hydraulic brake booster with a control valve that is hydraulically operated as a function of an input force applied to a plunger by an operator to proportionally develop an output force that acts on a piston arrangement to pressurize operational fluid that is supplied to wheel brakes to effect a brake application.

A further object of this invention resides in a brake system having a control valve with an actuation piston having a plurality of effective areas that may receive hydraulic inputs under the control of an ECU to modify an operational hydraulic input signal derived from an input force applied by an operator to effect a brake application.

BRIEF DESCRIPTION OF THE DRAWINGS

FIG. 4 is a sectional view of a second actuation piston for the control valve of FIG. 1.

DETAILED DESCRIPTION

Figure 1:
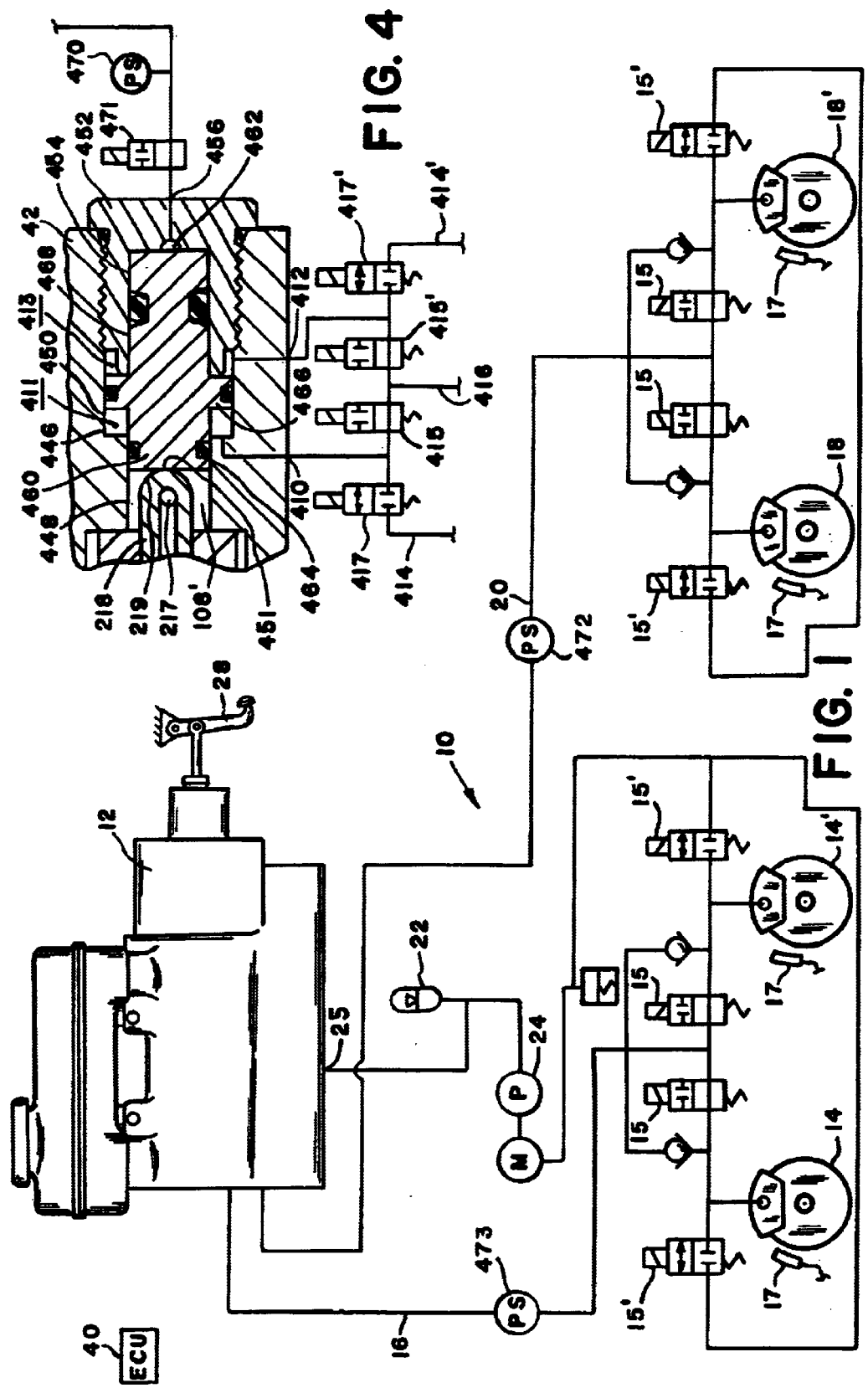
FIG. 1 is schematic illustration of a brake system including a hydraulic brake booster according to the teachings of the present invention.

The brake system 10 as shown in FIG. 1 includes a hydraulic brake booster 12 connected by a first conduit 16 to a first set of wheel brakes 14,14' and by a second conduit 20 to a second set of wheel brakes 18,18'. The hydraulic brake booster 12 receives pressurized supply fluid from a source that may include an accumulator 22 and a motor pump 24. Each wheel in the first set of wheel brakes 14,14' and the second set of wheel brakes 18,18' includes a build solenoid valve 15, a decay solenoid valve 15' and a wheel speed sensor 17 to provide the electronic control unit (ECU) 40 with an input signals relating to a current functional operational of the vehicle. In addition to these input signals, the ECU 40 also receives and evaluates other inputs and data relating to the operation of the vehicle including but not limited to: the operation of the motor pump; the pressure of the pressurized supply fluid; dynamic forces experienced by the vehicle; accumulator fluid supply pressure, the level of fluid in a reservoir and etc. all inputs which relate to the operation of the vehicle and may effect a brake application. The hydraulic brake booster 12 is designed to be selectively activated by either a manual force applied by an operator to brake pedal 28 to effect a first brake application or by a hydraulic force derived from an input signal developed by ECU 40 in response to sensed conditions experienced with respect to the operation of the vehicle to effect a second brake application.

In more particular detail, the hydraulic brake booster 12 has a housing 42 that is defined by a stepped bore 44 that is separated from a control bore 46, a first outlet port 50 that connects the stepped bore 44 with conduit 1 6, a second outlet port 52 that connects the control bore 46 with conduit 20, an inlet port 54 connected by conduit 25 to accumulator 22, compensation ports 58,58' that connect the stepped bore 44 with reservoir 13, a control passage 60 that connects the stepped bore 44 with the control bore 46 and a supply passage 62 that connects the control bore 46 with the stepped bore 44. The stepped bore 44 retains a piston arrangement 100 while the control bore 46 retains a control valve 48 for controlling the communication of pressurized supply fluid from accumulator 24.

The piston arrangement 100 has a cylindrical member 102 with a first peripheral surface 104 concentrically located in the stepped bore 44 to define an output chamber 106, a relief chamber 108 and a power chamber 110 within the housing 42. The cylindrical member 102 has a first end 112 that is located in the output chamber 106 and a second end 114 that is located in the power chamber 110 and a stepped bore 116 that extends from the first end 112 to the second end 114. The cylindrical member 102 has a first radial passage 118 that connects a groove 120 with the stepped bore 116 and a second radial passage 122 that connects the stepped bore 116 with relief chamber 108. The stepped bore 116 is designed to receive a reaction piston 124 having a peripheral surface 126 thereon that is concentrically located in stepped bore 116.

The reaction piston 124 is defined by a cylindrical member having a first section 128 and a second section 130 with the first section 128 being located in corresponding first 132 and second 134 diameters of second stepped bore 116 and with the second section 130 being located in the second 134 and third 136 diameters of the second stepped bore 116. The first section 128 has a shoulder 138 that engages a corresponding shoulder 133 on cylindrical member 124 such that radial bore 119 is aligned with radial bore 118 to define a flow path from blind stepped axial bore 140. The first section 128 also has a additional blind bore 142 that extends from the output chamber 106 for receiving head 144 on linkage of the cage for the center port compensation valve 146, the center port compensation valve 146 being of a type as disclosed in U.S. Pat. No. 5,943,863. The second section 130 has a stepped bore 150 that extends from a first end 152 to a second end 154 with a first diameter 156 forming an extension for stepped bore 140 in the first section 128, a second intermediate diameter 160 and a larger third diameter 162 that extends inwardly from the second end 154. The stepped bore 150 is designed to receive a plunger 164 and a poppet valve arrangement 170 to define an actuation chamber 166 within the cylindrical member 124. The plunger 164 is directly connected to the brake pedal 28 through push rod 29 while the poppet valve arrangement 170 is resiliently located in the actuation chamber 166.

The poppet valve arrangement 170 has a cylindrical body 172 with a first end 174 with a first diameter surface that engages diameter 158 and a second end 178 with a smaller second diameter surface of the stepped axial bore 150. Cylindrical body 172 has a stepped bore 182 that extends from the first end 174 to the second end 178 with a larger internal first diameter adjacent the first end 174 to define a first shoulder 184 for an intermediate second internal diameter and a second shoulder 186 with a smaller third internal diameter adjacent the second end 178. A spring 188 that surrounds the second diameter 186 is positioned between the cylindrical body 172 and plunger 164 by a stem 190. A head 192 on a first end of stem 190 engages shoulder 186 on the cylindrical body 172 while the other end is screwed into plunger 164 to cage the spring 188 between the cylindrical body 172 and plunger 164 to establish a predetermined length between a face on the first end 174 and plunger 164. The face on end 174 has a radial groove for retaining a seal 175, such as the multiple faced seal shown in FIG. 2, while the first diameter surface 176 has an axial groove for retaining a seal 179 that engages surface diameter 160 such that communication between the actuation chamber 166 and stepped bore 182 occurs through a plurality of radial passages 181 (only one of which is shown). A return spring 194 located in the stepped bore 182 has a first end that engages shoulder 141 in stepped bore 140 of the first section and a second end that engages shoulder 184 to urge the cylindrical body 172 away from seat 169 in the second section to provide a path for fluid communication between stepped bore 182 and the relief chamber 108 and the control bore 46.

The cylindrical body 102, reaction piston 124 and plunger 164 all carrying seals to assure that the output chamber 106, relief chamber 108, power chamber 110 and actuation chamber 166 are sealed in an appropriate manner. The cylindrical body 102 and reaction piston 124 are retained in stepped bore 44 by an end cap 125 and wire rings 123,123' while the plunger 164 is retained in the bore diameter 162 of the reaction piston 124 by a wire ring 121.

Figure 2:
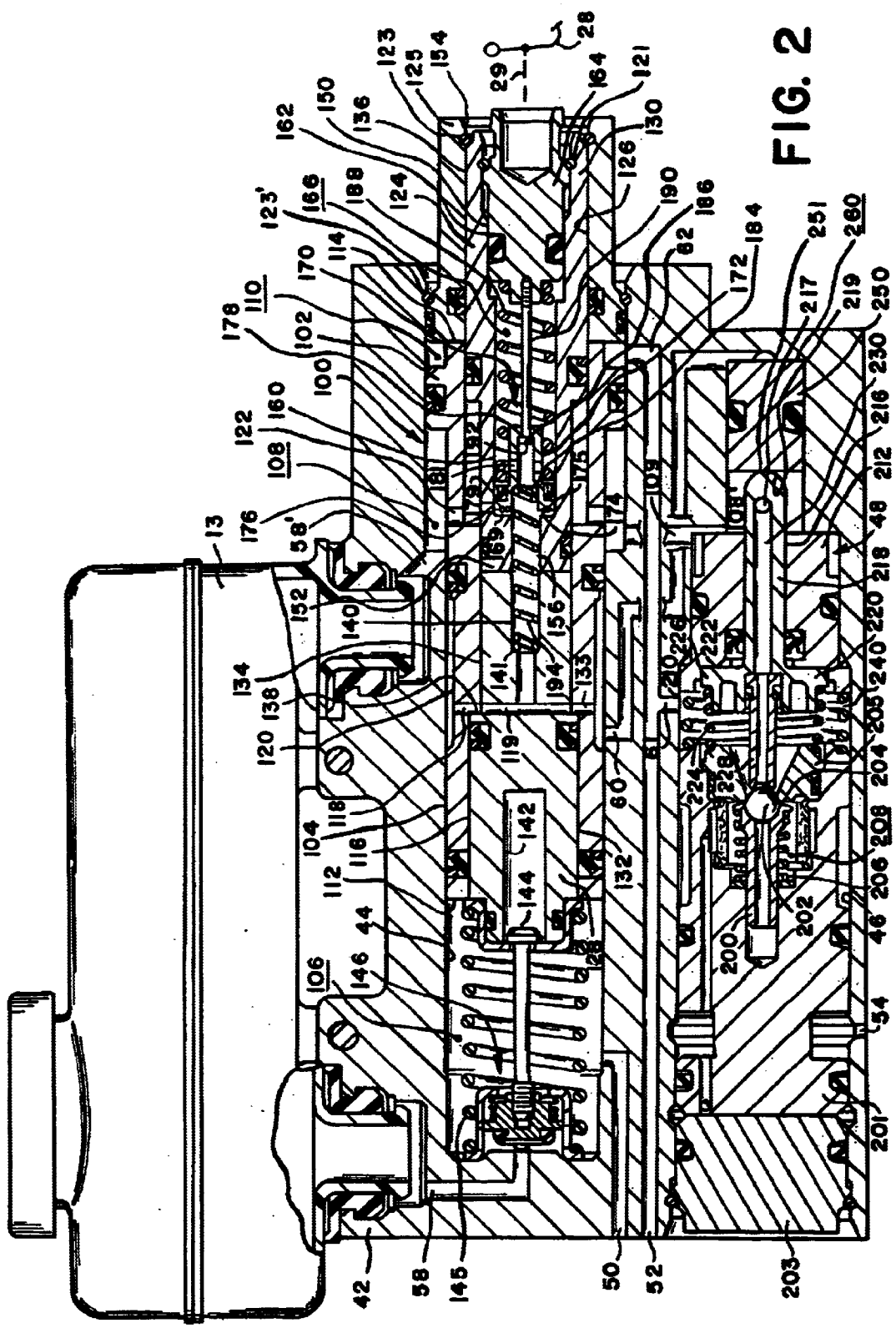
FIG. 2 is a sectional view of the hydraulic brake booster of FIG. 1 in a position of rest.

The control valve 48 that is located in control bore 46 is similar to that disclosed in U.S. Pat. No. 4,514,981 in that a stem 200 located in a first bearing 201 has a ball 202 retained on the end thereof that is urged toward a seat 204 on a cylindrical member 205 by a spring 206 to seal a chamber 208 connected the supply of pressurized fluid available at inlet port 54. The first bearing 201 is held in bore 46 by an end plug 203 such that a spring 210 urges a second bearing member 212 toward a shoulder 214 in housing 42 to define a distribution chamber 240 that is connected by passage 61 to passageway 62 connected to outlet port 52 associated with the second set of wheel brake 18,18' and power chamber 110 associated with the stepped bore 44. The second bearing member 212 has an axial bore 216 which in turn retains a stem 218 associated with a plunger 220. Plunger 220 is urged toward a stop 222 by a spring 224 located between cylindrical member 205 and the rib 226 on stem 218. A tube 228 attached to stem 218 forms an extension from an axial bore 230 of stem 218. Stem 218 has an opening 217 adjacent a spherical end 219 to provides a flow path from distribution chamber 240 to a relief chamber 108' formed in control bore 46 between bearing member 212 and an actuation piston 250. Relief chamber 108' is connected by passage 109 to relief chamber 108 in,the stepped bore 44. The spherical end 219 on stem 218 is received in a corresponding spherical indentation 251 in actuation piston 250 retained in control bore 46. The actuation piston 250, as shown in FIG. 2, engages the control bore 46 to define an actuation chamber 260 within the control bore 46. The actuation chamber 260 is connected to passage 60 coming from stepped bore 44 to receive an input signal from actuation chamber 166 such that the control valve 48 meters pressurized supply fluid to effect a brake application in accordance with the input force applied to brake pedal.

Mode of Operation

Figure 3:
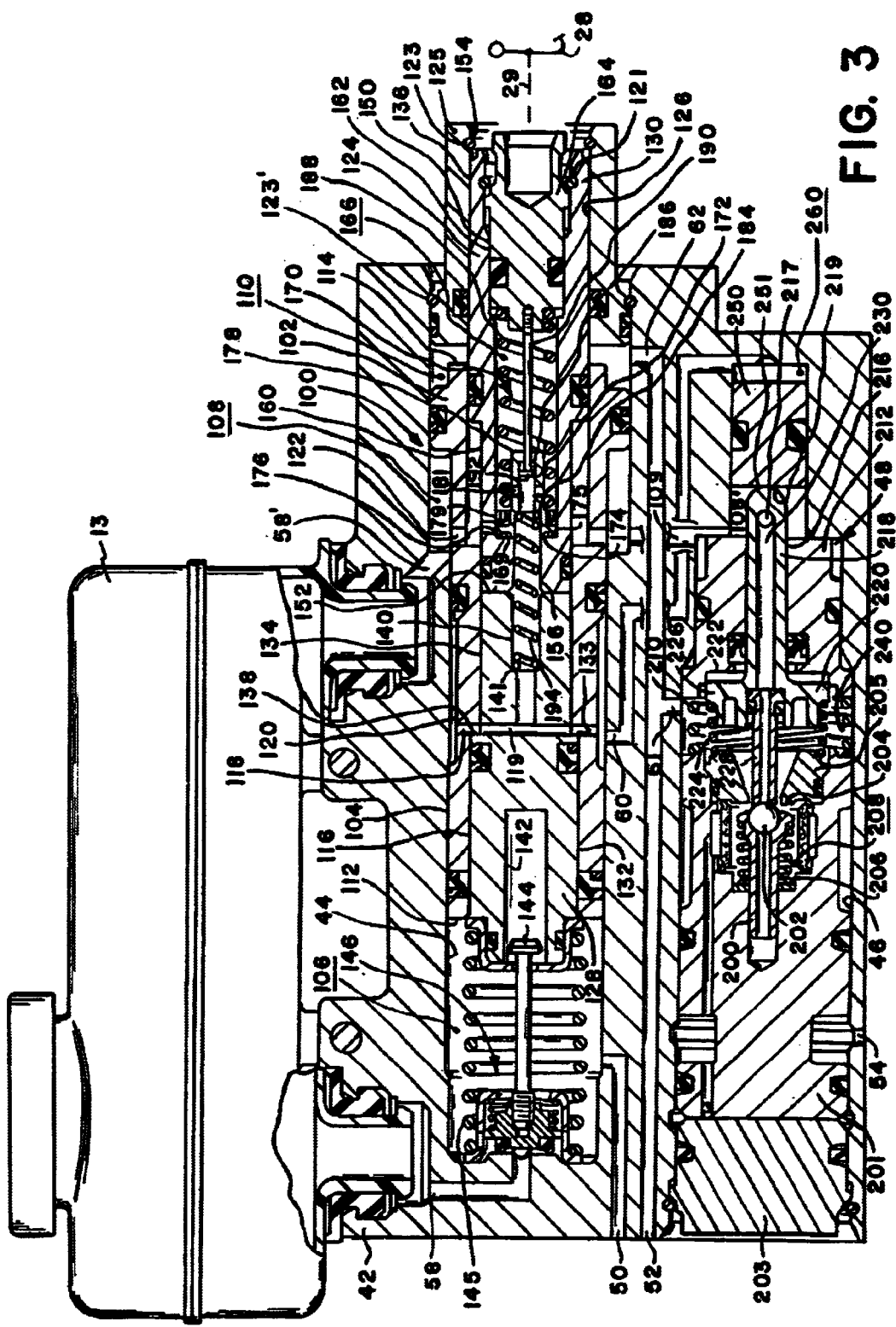
FIG. 3 is a sectional view of the hydraulic brake booster of FIG. 1 in an actuated position.

In a vehicle equipped with a brake system 10, the ECU 40 receives many signals indicative of the operation of the vehicle and the conditions under which the vehicle is currently experienced. With respect to the brake system, a sensor associated with accumulator 22 provides an indication of the current level of pressurized supply fluid stored therein and should the level be below a set value, a signal is provided to actuate motor pump 24 to raise the level of the pressure of the fluid in the accumulator 22. The pressurized supply fluid from the accumulator 22 is available in chamber 208 in the control bore 46 by way of inlet port 54. When an operator desires to effect a brake application, an input force is applied to brake pedal 28 and transmitted through input rod 29 to plunger 164. The input force after overcoming return spring 194 moves plunger 164 and poppet valve 110 toward the reaction piston 124 such that double faced seal 175 engages seat 169 to interrupt communication from actuation chamber 166 to relief chamber 108 by way of passage 176 as illustrated in FIG. 3. Further movement of plunger 164 by the input force pressurizes the fluid in chamber 166 that is thereafter communication to actuation chamber 260 in the control bore as an input signal. The input signal presented to actuation chamber 260 acts on the actuation piston 250 to develop a corresponding operational force that is communicated through stem 218 to move the end of tube 228 into engagement with ball 202 to interrupt communication between distribution chamber 240 and relief chamber 108' by way of passageway 219 and opening 217 in stem 218. Further movement of stem 218 by the operational force moves ball 202 off seat 204 to allow pressurized supply fluid to be communicated from chamber 208 into distribution chamber 240 for delivery to the second set of wheel brakes 18,18' by way of passage 61 and passage 62 and to the power chamber 110 in the stepped bore 44. The metered pressurized supply fluid in power chamber 110 acts on end 114 of the cylindrical body 102 and after overcoming return spring 145 moves end 112 toward the output chamber 106 such that poppet spring 149 moves seal 174 into engagement with seat 169 to seal compensation port 58. Further movement of cylindrical body 102 pressurizes fluid in chamber 106 to a corresponding operational level and the operational pressurized fluid is communicated to the first set of wheel brakes 14,14 to effect the brake application therein in accordance with the input force applied to brake pedal 28. During a brake application, shoulder 133 on cylindrical body 102 engages shoulder 138 on the first section 128 of the reaction piston 124 and as a result the reaction piston 124 moves with the cylindrical body 102 as fluid is pressurized in chamber 106 as the input force applied to plunder 164 keeps the section 130 in engagement with the first section 128. The resistance to movement of the cylindrical body 102 is communicated back to the actuation chamber 166 to oppose the input force and when a balance occurs, the input signal as received by the actuation chamber 260 is also balanced such that spring 206 seats ball 202 on seat 204 to limit the communication of pressurized supply fluid from chamber 208 to the distribution chamber 240. When the operator terminates the input force on brake pedal 28, return spring 194 moves the poppet valve 170 and plunger 124 toward a stop defined by wire ring 121 such that seal 175 moves away from seat 169 to open communication to relief 108 from actuation chamber 166, distribution chamber 240 and power chamber 110 developed during the brake application. In addition, return spring 145 moves the cylindrical body 102 away from the outlet chamber 106 such that poppet 174 moves away from seat 169 to eliminate the fluid pressure therein and to allow communication with reservoir 13 to replenish any fluid necessary to maintain the first set of wheel brakes 14 in brake system 10. It should be understood that any fluid necessary to maintain the second set of wheel brakes 18,18 is replenished through compensation port 58' by way of relief chamber 108, passage 109, relief chamber 108', the axial bore in stem 218, distribution chamber 240, passage 61 and passage 62. When the fluid pressure is relieved the components are in the rest position as illustrated in FIG. 2.

For some applications, it may be desirable to modify the input signal generated as a result of the input force applied to brake pedal 28 to achieve optimum operation of the vehicle and brake system 10. The means for modifying the input signal to provide for adaptability of the brake booster to meet operational requirement of a brake system for various vehicle uses could be achieved by changing the diameter of the actuation piston 250. In application, the input signal produced by the input force could be in a direct proportion with respect to the diameter of the plunger and actuation piston or a function thereof depending whether it was desired to have a gain or a subtraction with respect to the output force for effecting a brake application. With such a modification, the resulting output force would always be a constant functional relationship, however, with the introduction of traction control, dynamic control and anti-lock in a brake system under the control of an ECU 40 it may be advisable to provide for additional modification structure. The structure illustrated in FIG. 4 can be utilized to achieve a modification of the input signal through the inclusion of inputs from the ECU 40. In more detail, such modification can be achieved by changing housing 42 of the brake booster illustrated in FIG. 2 to include additional ports 410 and 412 and additional actuation chambers in the control bore 446. The additional ports 410 and 412 are connected through build solenoids 415,415' in supply conduit 416 to accumulator 22 and through decay solenoids 417,417' in relief conduits 414,414' to the reservoir for the motor pump 22. The build solenoids 415,415' and decay solenoids 417,417' connected to and under the control of the ECU 40. The control bore 446 includes a first diameter 448 and a second diameter 450 with an end plug 452 screwed into the second diameter 450 to closed this end of the control bore 446. The end plug 452 has a bore diameter 454 that is identical with the first diameter bore 448 and is connected receive the input signal through inlet port 456. The actuation piston 460 is designed to be received in control bore 446 for defining an actuation chamber 462 adjacent inlet port 456. Actuation piston 460 has cylindrical body with a first diameter 464 sealing located in the first diameter 448 to define relief chamber 108', a second diameter 466 sealingly located in the second diameter 450 to define a first modification chamber 411 and a second modification chamber 413 and a third diameter 468 sealingly located in bore diameter 454 of the end plug to define the actuation chamber 462. The face on the actuation piston 460 has a spherical indentation 451 for receiving spherical surface 219 on stem 218 of the control valve 48. The brake booster 12 further includes a first pressure sensor 470 connected to receive and provide the ECU 40 with an indication of the input signal supplied to the actuation chamber 456, a control solenoid 471, a second pressure sensor 472 connected to receive and provide the ECU 40 with an indication of the operational metered pressurized supply fluid communicated to the power chamber 110 and a third pressure sensor 473 to provide the ECU 40 with an indication of the fluid pressure supplied to wheel brakes 14,14' to effect a brake application.

With the structure illustrated in FIG. 4, the ECU 40 can modify the input signal generated as a result of an input force applied to brake pedal 28 or if conditions that are measured by the sensors and communicated to the ECU 40 indicate the safe operation of the vehicle could best be achieved through a brake application of one or more brakes, the ECU 40 can independently generate a brake application.

During an operator initiated brake application, the input signal acts on the effective area of the actuation piston 460 in actuation chamber 462 to develop a force to activate control valve 48 in a manner described above with respect to FIG. 2. However, if the ECU 40 determines that the input signal needs to be modified as a result of the sensed conditions, the ECU can send an actuation signal to open modification solenoid build valve 415' and close solenoid decay valve 417 to allow pressurized fluid to flow from accumulator 22 by way of conduit 416 to chamber 413 and act on the effective area defined by the second diameter 466 and to develop a force that is added to the input force that acts on stem 218 to activate the control valve during a brake application. Similarly, the ECU 40 could send an actuation signal to open modification solenoid build valve 415 and close solenoid decay valve 417 to allow pressurized fluid to flow from accumulator 22 by way of conduit 416 to chamber 411 and act on the effective area defined by the second diameter 466 and to develop a force that would oppose the input force presented to chamber 462 that acts on stem 218 to activate the control valve 48 to effect a brake application. In an extreme situation, the ECU 40 could activated the control solenoid 471 to interrupt the input signal to chamber 462 such that the brake application would immediately terminate. Thus, in an operator initiated brake application, the ECU 40 could be utilized to provide an input for modifying the input force derived from an input force applied to plunger 164 to achiever an optimum brake application from the input force applied by the operator. 23 Should the ECU 40 determine that the vehicle is operating under condition wherein safety may be better achieved at a slower speed, the ECU 40 can independently effect a brake application by supplying an actuation signal to solenoid build valve 415' and solenoid decay valve 417' to allow pressurized supply fluid to be communicated to chamber 413. The pressurized supply fluid presented to chamber 413 acts on the effective area of piston 460 defined by diameter 466 to develop an input force that moves stem 218 to activate control valve 48 and effect a brake application in a same manner as described above with respect to the input signal derived from the manual input force.

We claim:

1. A hydraulic brake booster for use in a brake system having a housing with a first stepped bore separated from a control bore, said first stepped bore retaining a piston arrangement and said control bore retaining a control valve, said first stepped bore being connected to a first set of wheel brakes, said control bore being connected to a source of pressurized supply fluid, to said first stepped bore and to a second set of wheel brakes of a vehicle, an input member connected to said piston arrangement, said control valve being responding to an input signal derived from an input force applied by an operator through said input member to said piston arrangement to effect a brake application by communicating regulated pressurized supply fluid from said control bore to said first stepped bore and!to said second set of wheel brakes, said regulated pressurized supply fluid received by said first stepped bore acting on and moving said piston arrangement in said first stepped bore to pressurize operational fluid therein that is supplied to effect the application of said first set of wheel brakes, said hydraulic brake booster being characterized by said piston arrangement having a cylindrical member with a first peripheral surface concentrically located in said first stepped bore to define an output chamber, a relief chamber and an power chamber in said housing, said cylindrical member having a second stepped bore therein for receiving a reaction piston, said reaction piston having a second peripheral surface concentrically located in said second stepped bore and an axial bore therein, a plunger located in said axial bore to define an actuation chamber, said plunger being connected to said input member, and poppet valve means located in said axial bore for controlling communication of fluid between said actuation chamber, said relief chamber and said control bore, said input force on being applied by an operator to said input member initially moving said plunger and poppet valve means to interrupt communication from said actuation chamber to said relief chamber and thereafter moving said plunger to pressurize fluid in said actuation chamber and create said input signal for activating said control valve in said control bore whereby said regulated pressurized supply fluid is supplied said power chamber for moving said first cylindrical body toward said output chamber to pressurizing fluid in the output chamber to a predetermined level to create said operational fluid that is communicated to effect the actuation of said first wheel brakes during a brake application.

2. The hydraulic brake booster as recited in claim 1 wherein said cylindrical member is characterized by said second stepped bore having a first diameter being separated from a second diameter by a first shoulder and said second diameter being separated from a third diameter by a second shoulder, and in that said reaction piston is characterized by a first section and a second section, said first section being located in said first and second diameters of said second stepped bore and with said second section being located in said second and third diameters of said second stepped bore, said first shoulder on said cylindrical member engaging and moving said first section toward said output chamber during a brake application while said second section correspondingly moves as a function of the input force.

3. The hydraulic brake booster as recited in claim 2 wherein said second section of said reaction piston is characterized by a radial passage that connects said axial bore to said relief chamber and a passage that connects said axial bore to said control bore by way of a cross bore in said cylindrical member and a passageway in said housing, said poppet valve means sealing said radial passage on movement of said plunger by an input force to allow said input signal to be communicated from said actuation chamber and to said control bore for actuating said control valve.

4. The hydraulic brake booster as recited in claim 3 wherein said poppet valve means is characterized by a cylindrical body having a first end with a first diameter surface that engages said axial bore and second end with a second diameter surface, said cylindrical body having a third stepped bore that extends from said first end to said second end with a larger internal first diameter adjacent said first end, an intermediate second internal diameter and a smaller third internal diameter adjacent said second end, a first spring located between said cylindrical body and said plunger, linkage for caging said first spring between said cylindrical body and said plunger and a second spring acting on said cylindrical body to urge said plunger against a stop in said second section of said reaction piston.

5. The hydraulic brake booster as recited in claim 4 wherein said poppet valve means is further characterized by a first seal being located in a groove in said first diameter surface that engages said axial bore and a second seal located on a face adjacent said first end that engages a seat in said second section on movement of the plunger and poppet means by said input force to prevent communication of said input signal from said actuation chamber to said relief chamber.

6. The hydraulic brake booster as recited in claim 5 wherein said hydraulic brake booster further characterized by said control valve having an actuation piston located in said control bore to define a second actuation chamber therein, said actuation piston responding to said input signal by initially moving a stem into engagement with a ball and thereafter said ball off a seat to communication said pressurized supply fluid to said second set of wheel brakes and said power chamber to effect a brake application.

7. The hydraulic brake booster as recited in claim 6 wherein said second actuation chamber is characterized by a first section connected to receive said input signal, a second section connected to receive a second input signal and a third section connected to receive a third input signal, said second and third input signals being under the control of an Electronic Control Unit (ECU) for independently activating said control valve to effect a brake application and diminish a sensed condition in a vehicle.

8. The hydraulic brake booster as recited in claim 1 wherein said hydraulic brake booster is characterized by means to modify said input signal as applied to activate said control valve as a function of condition sensed by an Electronic Control Unit (ECU).

9. The hydraulic brake booster as recited in claim 8 wherein said control valve is characterized by an actuation piston having a first effective area and a second effective area located in said control bore to define first, second and third actuation chambers, said first actuation chamber receiving said input signal while said second and third chamber receive second and third input signals which may be added to or substrated from the input signal to actuate said control valve.

10. The hydraulic brake booster as recited in claim 1 wherein said control valve is characterized by a first section connected to receive said input signal, a second section connected to receive a second input signal and a third section connected to receive a third input signal, said second and third input signals being under the control of an Electronic Control Unit (ECU) for independently activating said control valve to effect a brake application and diminish a sensed condition in a vehicle.

* * * * *